April 22, 1941.　　　G. C. WHITE　　　2,239,137
VALVE GEAR
Filed July 24, 1939　　　3 Sheets-Sheet 1

George C. White,
INVENTOR
BY Victor J. Evans & Co.
ATTORNEYS

April 22, 1941.  G. C. WHITE  2,239,137
VALVE GEAR
Filed July 24, 1939  3 Sheets-Sheet 2
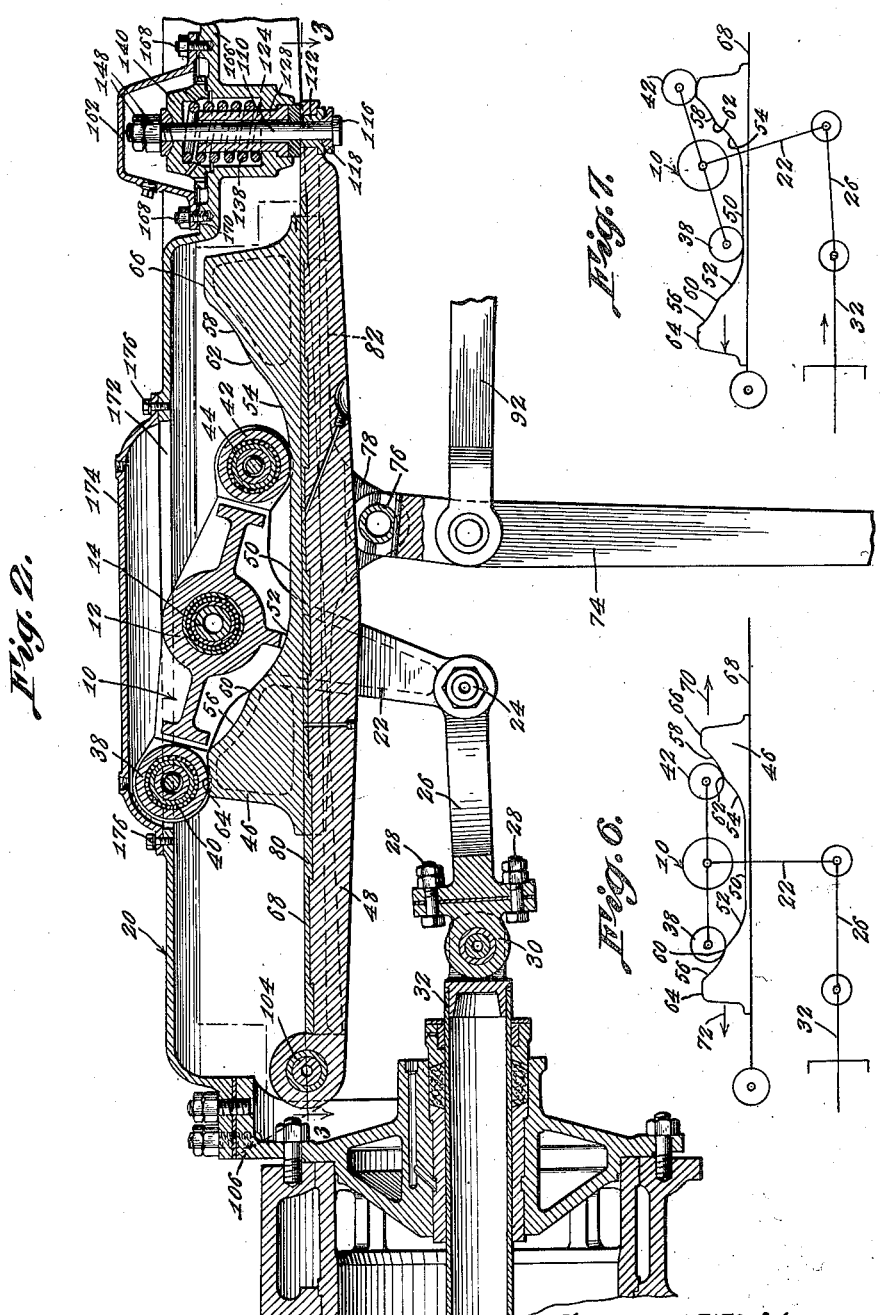
George C. White
INVENTOR
BY Victor J. Evans & Co.
ATTORNEYS

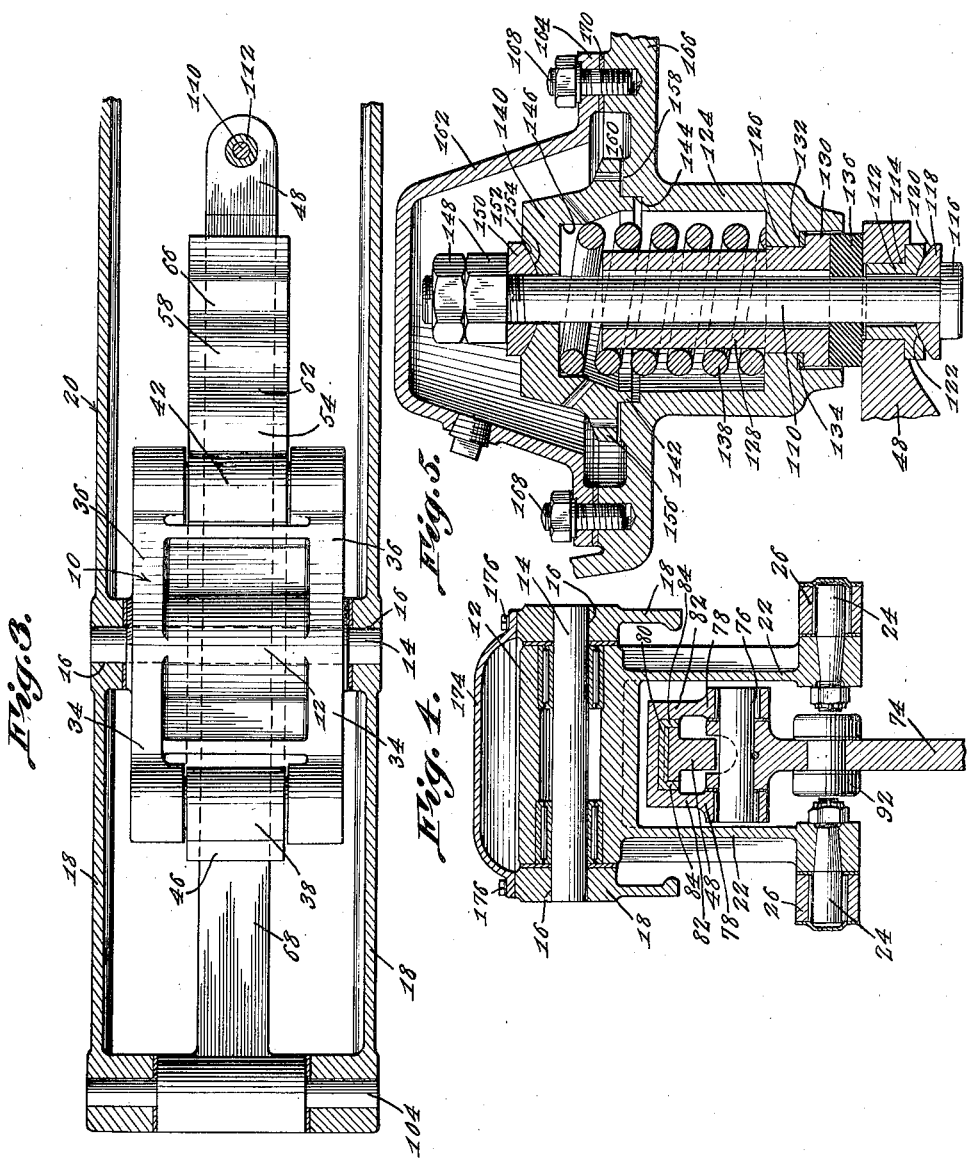

Patented Apr. 22, 1941

2,239,137

UNITED STATES PATENT OFFICE 2,239,137

VALVE GEAR

George C. White, Highland Park, N. J.

Application July 24, 1939, Serial No. 286,276

10 Claims. (Cl. 121—167)

My invention relates to steam locomotives, and has among its objects and advantages the provision of an improved valve gear.

The present invention relates to a valve gear, particularly the means for actuating the slide valve or piston valve of the engine, of the type disclosed in the application filed by John J. Kupka and Gordon T. Wilson on November 12, 1936, Serial Number 110,516, since issued as Patent No. 2,218,824, dated October 22, 1940, wherein novel means are employed for accelerating the reciprocatory motion of the slide valve or piston valve so as to permit the entrance and exhaust of the pressure steam at the critical instances required to provide a high degree of efficiency in power output.

The above-mentioned application also discloses means whereby the travel of the slide valve or piston valve is materially reduced so as to effect an appreciable reduction in the size and wear of the moving parts, particularly the slide or piston valve and its housing. These features are in distinction to conventional valve gear equipment wherein the movement of the slide valve or piston valve is directly proportional to the rate of cutoff.

In the above-identified application, the valve rod is operatively connected with a motion accelerator mechanism in the nature of a rocker unit actuated through the medium of a reciprocating cam. The mechanism functions efficiently with respect to the actuation of the slide valve or piston valve, but no means are provided to compensate for structural irregularities in the shape of the cam profiles or backlash due to wear.

Accordingly, an object of my invention is to provide a valve gear of the type described wherein novel means are incorporated to compensate for structural irregularities in the shape of the cam profiles or backlash incident to wear. More specifically, I provide a rocker mechanism having an operating connection with the valve rod, which rocker mechanism is actuated through the medium of a reciprocatory cam nut resiliently mounted so as to effectively compensate for structural irregularities and backlash. The cam unit is slidably mounted on a guide bar pivoted at one end to a fixed support and yieldingly supported at its opposite end through the medium of a novel spring mechanism adapted to be accurately adjusted for maintaining a predetermined pressure relation between the cam unit and the rocker mechanism.

In the accompanying drawings:

Figure 2 is an enlarged sectional view of the rocker mechanism and the cam unit;

Figure 3 is a sectional view taken substantially along the line 3—3 of Figure 2;

Figure 4 is a transverse sectional view;

Figure 5 is an enlarged sectional view of the resilient mounting for the guide bar;

Figure 6 is a diagrammatic view illustrating the midstroke position of the rocker mechanism and its associated cam; and Figure 7 is a diagrammatic view illustrating the opposite extreme position of the rocker mechanism and the associated cam, as distinguished from the extreme position of these parts, as illustrated in Figure 2.

Figure 1:
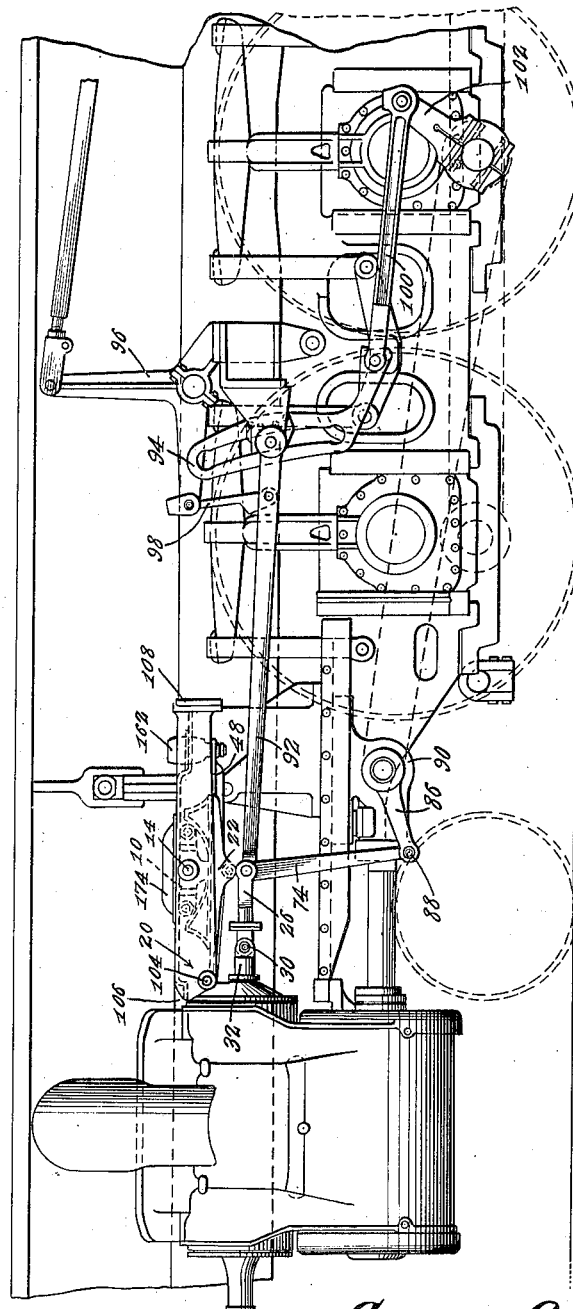
Figure 1 is a side elevational view of a valve gear in accordance with my invention.

In the embodiment selected to illustrate my invention, I make use of a rocker mechanism 10 in the nature of a T-shaped bell crank provided with a bearing 12 mounted on a shaft 14 having its ends anchored in openings 16 in the side walls 18 of a casting 20 in the nature of a housing for the rocker mechanism, see Figs. 2, 3 and 4. Shaft 14 constitutes a fulcrum for the rocker mechanism.

Rocker mechanism 10 includes depending arms 22 each provided with a knuckle-pin 24 pivotally connected with a yoke 26 bolted at 28 to a joint 30 operatively connected with the valve rod 32 for actuating the slide or piston valve of the engine (not shown). Rocker mechanism 10 includes spaced arms 34 and 36, which arms are arranged with their longitudinal axes at right angles to the axes of the depending arms 22.

A roller 38 is mounted on a bearing 40 located between and carried by the spaced arms 34, while a roller 42 is mounted on a bearing 44 positioned between and carried by the spaced arms 36. Rollers 38 and 42 are arranged in contact with a cam 46 which slides longitudinally on a guide bar 48. Cam 46 is fashioned with a straight face 50 terminating in concaved cam faces 52 and 54 which incline upwardly and are separated from concaved faces 56 and 58, respectively, by convexed cam faces 60 and 62, respectively. Cam faces 56 and 58 respectively blend into dwell faces 64 and 66, which faces parallel the face 68 on the guide bar 48 on which the cam 46 slides. Fig. 6 illustrates the rollers 38 and 42 in the midstroke position of the rocker mechanism 10, at which time the rollers lie substantially on the apices of the convexed faces 60 and 62, with the axes of the rollers 38 and 42 and the shaft 14 lying in a plane paralleling the face 68. Fig. 2 illustrates the cam 46 positioned in one extreme position, at which time the depending arms 22 project forwardly their maximum distances. Fig. 7 illustrates the cam in its other extreme position, at which time the depending arms 22 will be swung backwardly to their maximum distances.

With the rocker mechanism 10 in the position of Fig. 2, roller 42 lies on the flat face 50 and the roller 38 is lying on the dwell face 64. Cam faces 52, 60 and 56 are so arranged as to define an incline blending gently into the flat face 50 for coaction with the roller 38, while cam faces 54, 62 and 58 define a corresponding incline at the opposite end of the cam for coaction with the roller 42. With the rocker mechanism 10 adjusted according to the diagram of Fig. 6, shifting of the cam 46 in the direction of the arrow 70 will cause the roller 42 to descend on the cam face 54 and the roller 38 will be caused to ascend on the cam face 56 until it is brought onto the dwell face 64. Such action of the cam 46 will cause the rocker mechanism 10 to pivot from the position of Fig. 6 to that illustrated in Fig. 2, which action imparts an inward movement of the valve rod 32. After the roller 38 rides upon the dwell face 64, pivotal movement of the rocker mechanism 10 will be arrested so that further movement of the cam will not impart further pivotal action to the rocker mechanism.

Similarly, assuming that the rocker mechanism 10 is positioned according to Fig. 6 for the sake of clearness in description, shifting of the cam 46 in the direction of the arrow 72 will cause the roller 38 to descend on the cam face 52 and the roller 42 will be caused to ascend on the cam face 58 and upon the dwell face 66. Dwell faces 64 and 66 are so arranged that either of the rollers 38 or 42 will pass onto its respective dwell face simultaneously with the entry of the other roller upon the flat face 50. Thus, reciprocatory motion of the cam 46 is translated into oscillatory movement of the depending arms 22 for reciprocating the valve rod 32 for actuating the slide valve (not shown).

The cam faces on the cam 46 are so related to the rollers 38 and 42, which govern the action of the rocker mechanism 10, as to accelerate the movement of the valve rod 32 for opening and closing of the slide valve. As the cam 46 is moved in one direction, the rocker mechanism 10 immediately assumes an angular position so as to rapidly move the slide valve or piston valve for the admittance of steam. Movement of the cam 46 in the opposite direction causes a reverse action to take place so that the slide or piston valve will be rapidly moved to its exhaust position. Thus, the accelerated travel imparted to the slide valve or piston valve during the opening and closing actions thereof permits a substantial decrease in the total travel of the slide or piston valve, with consequent improvement in operation of the engine and considerable reduction in the time required to open and close the slide or piston valve. With the exception of the specific contours of the cam faces of the cam 46, the operation incident to the structure so far described is substantially identical with that set forth in said above-mentioned application.

Reciprocation of the cam 46 is consummated through the medium of a lap and lead lever 74 having its upper end pivotally connected at 76 with depending ears 78 formed integrally with the cam 46. The guide bar 48 is provided with a babbitt liner 80 on which the cam 46 slides, and the cam is provided with downwardly extending flanges 82, between which flanges and the side edges of the guide bar 48 are positioned babbitt liners 84 which are fashioned as a continuation of the liner 80. Thus, the bottom structure of the cam 46 is in the nature of a channel for the reception of the guide bar 48, so that the cam is effectively restrained from lateral displacement but is free to slide longitudinally of the guide bar. Lap and lead lever 74 is pivotally connected at its lower end with a lap and lead link 86, as at 88, see Fig. 1. Lap and lead link 86 is connected with the crosshead 90, and the lap and lead lever 74 is pivotally connected with the forward end of a radius rod 92 a short distance beneath the flexible or pivotal connection between the upper end of the lever and the cam 46. The opposite end of the radius rod 92 is operatively connected with a conventional link 94 through the medium of the usual slide block, and a bell crank 96 is connected with the radius rod 92 through the medium of a link 98 so that the rod may be adjusted relatively to the link in the usual manner. Link 94 is connected with the usual eccentric rod 100, which in turn is connected with the crank 102. Thus, the cam 46 is reciprocated through oscillatory movement of the lap and lead lever 74 which is operatively connected with the radius rod 92. These rods and levers are old and well known in the art and their action need not be described in further detail.

The principal feature of my invention is directed to means designed to compensate for structural irregularities in the shape of the cam profiles or backlash incident to wear. Guide bar 48 is pivotally connected to one end of the casting 20 by a bearing pin 104, and this end of the casting is bolted to a supporting bracket 106. The opposite end of the casting is anchored to a frame structure 108 of the locomotive, see Fig. 1. The opposite end of the guide bar 48 is connected with a link 110 which extends through a bushing 112 positioned in a bore 114 in the guide bar 48, see Fig. 5. The head 116 of the link 110 engages a washer 118 having a curved face 120 engaging a correspondingly fashioned face 122 on the bushing 112.

Link 110 extends vertically and centrally of a dashpot 124, the bottom of which is provided with a bore 126 into which a sleeve 128 is pressed, but with the sleeve having loose fitting relation with the link. Sleeve 128 includes a flange 130 between which and the ledge 132 on the dashpot 124 I position a gasket 134. Between the flange 130 and the upper face of the guide bar 48 I position soft packing 136. Sleeve 128 serves as a positioning element for a compression spring 138 which has its lower end engaging the bottom of the dashpot 124 and its upper end engaging the dashpot cap 140. Dashpot cap 140 is provided with a flange 142 guided in its vertical movement through engagement with the wall of a bore 144 in the dashpot 124, so that the cover 140 will be restrained from lateral movement relatively to the dashpot but is free to move vertically within predetermined limits.

The upper end of the compression spring 138 fits snugly inside a bore 146 in the dashpot cover 140 while the sleeve 128 affords support for the spring against lateral displacement so that the spring and the cap 140 will be accurately centered with respect to the vertical axis of the dashpot. I provide the upper end of the link 110 with nuts 148, and the lowermost nut engages a washer 150 having a curved face 152 engaging a correspondingly shaped face 154 on the dashpot cover 140. Fig. 5 illustrates the normal position of the dashpot cover 140 relatively to the dashpot 124, at which time the dashpot cover flange 156 is spaced slightly from the ledge 158 on the upper end of the dashpot 124, as at 160. Spring 138 is under compression with the parts arranged according to Fig. 5.

It will thus be seen that the guide bar 48 is urged into pressure relation with the cam 46 for holding the rollers 38 and 42 in effective pressure relation with the cam profiles because of the spring 138. Under the influence of the rollers 38 and 42, guide bar 48 will always tend to exert a downward pull on the link 110 and unless the resisting forces opposed to this downward pull are at all times equal to said pull, a knock will develop. To effectively compensate for any irregularities due to imperfections in the shape of the cam profiles or due to wear or backlash in the rollers 38 and 42, it is essential that the guide bar 48 makes a limited relative movement in relation to the casting 20 in which the rocker mechanism 10 is journaled, so that roller contact is always assured without undue resistance against cam movement.

As an example, let us assume that during a movement from one of its extreme positions to the other, the cam 46 exerts a downward pull of say ten thousand pounds on the link 110. The tension of the spring 138 is set to only a fraction of this amount, let us say two thousand pounds. As the maximum load of ten thousand pounds does not occur immediately at the beginning of the movement, but increases gradually as the steepest slopes of the cam profiles act on the rollers 38 and 42, it follows that there is but a gradual movement of the dashpot cover 140 and the gap or space 160 will be closed gradually until a firm contact between the machined face of the ledge 158 and the lower face of the flange 156 is made, which is capable of carrying any load between the casting 20 and the guide bar 48. To still further dampen any possible shock loads resulting from a sudden taking up of the clearance 160, the whole of the dashpot mechanism operates in a bath of heavy viscosity liquid.

The tension of the spring 138 is adjusted in such a manner as to preload both rollers 38 and 42 in a definite ratio to their rated carrying capacity, which will prevent any tendency of the rollers to bounce off. A smooth operation at high speeds regardless of the state of wear will be thus obtained. To effectively eliminate an overload of the rollers 38 and 42 due to excessive spring tension, the clearance 160 may be checked from time to time by insertion of a feeler gauge of appropriate thickness. This can easily be accomplished through removal of the protecting cap 162 having a flange 164 secured to the flange 166 of the casting 20 through the medium of stud bolts 168. A gasket 170 is inserted between the flanges 164 and 166, and the soft packing 136 constitutes an effective seal to prevent leakage of the dashpot liquid.

The entire mechanism can readily be taken apart through removal of the bearing pin 104 and the nuts 148. Due to the center of the fulcrum of the rocker or T-shaped bell crank 10 being arranged midway between the bearing pin 104 and the link 110, a relatively small spring load will suffice to preload adequately the rollers 38 and 42 due to the leverage action because of such arrangement. Casting 20 is provided with an opening 172 normally closed by an inspection cover 174 detachably connected with the casting through the medium of bolts 176. Inspection cover 174 may be removed to permit a check-up of the rollers and the wearing surfaces of the cam 46. Casting 20 and the inspection cover 174 provide an enclosure for the rocker mechanism and the cam to prevent the entrance of dirt and to afford protection against the action of the elements.

Having thus described certain embodiments of my invention in detail, it is, of course, understood that I do not desire to limit the scope thereof to the exact details set forth except in so far as those details may be defined in the appended claims.

I claim:

1. In a steam locomotive including a valve gear lever system and a valve actuating rod: a relatively fixed support; a rocker means journaled in said support and operatively connected with said rod for reciprocating the latter; a sliding cam for the rocker means so fashioned as to impart accelerated motion thereto, including an operating connection with said lever system; a track for the sliding cam pivoted at one end to said support; and means cooperable with said support and the other end of said track for urging the cam against said rocker means, to compensate for backlash.

2. In a steam locomotive including a valve gear lever system and a valve actuating rod: a relatively fixed support; a rocker means journaled in said support and operatively connected with said rod for reciprocating the latter; a sliding cam for the rocker means so fashioned as to impart accelerated motion thereto, including an operating connection with said lever system; a track for the sliding cam pivoted at one end to said support; a link connection between the other end of the track and said support; and resilient means interposed in said link connection for yieldingly urging the cam against said rocker means.

3. In a steam locomotive including a valve gear lever system and a valve actuating rod: a relatively fixed support; a rocker means journaled in said support and operatively connected with said rod for reciprocating the latter; a sliding cam for the rocker means so fashioned as to impart accelerated motion thereto, including an operating connection with said lever system; a track for the sliding cam pivoted at one end to said support; a link connection between the other end of the track and said support; resilient means interposed in said link connection for yieldingly urging the cam against said rocker means; and means interposed in said link connection for limiting the free movement of said track.

4. In a steam locomotive including a valve gear lever system and a valve actuating rod: a relatively fixed support; a rocker means journaled in said support and operatively connected with said rod for reciprocating the latter; a sliding cam for the rocker means so fashioned as to impart accelerated motion thereto, including an operating connection with said lever system; a track for the sliding cam pivoted at one end to said support; a link connection between the other end of the track and said support; resilient means interposed in said link connection for yieldingly urging the cam against said rocker means; and means interposed in said link connection for limiting the free movement of said track; said link connection including relatively movable cup elements for containing a damping fluid, to cushion the track.

5. In a steam locomotive including a valve gear lever system and a valve actuating rod: a rocker means journaled in a fixed support and having a first arm operatively connected with said rod for reciprocating the latter; said rocker means having second arms each provided with a roller; a syncline cam coacting with said rollers and so fashioned as to impart accelerated motion to said first arm and said rod, including an operating connection between said cam and said lever system; a track for said sliding cam having one end pivotally connected with said fixed support; a dashpot carried by a fixed support, including a relatively movable dashpot cover having predetermined clearance with the dashpot; a link connected with the opposite end of the track and extending through the dashpot and the dashpot cover; an abutting connection between the link and the dashpot cover; and a spring interposed between said dashpot and the dashpot cover for normally maintaining said predetermined clearance, to urge said cam against said rollers, but yielding under abnormal forces to bring the dashpot cover into abutting engagement with the dashpot to limit the free pivotal action of the track.

6. The invention described in claim 5 wherein the dashpot cover and the track are provided with curved faces, and washers having curved faces engaging said first mentioned faces and interposed between said link and the dashpot cover and said track.

7. The invention described in claim 4 wherein said fixed support includes side walls and a top wall having an inspection opening exposing said rocker means to view, and a cover removably secured to said support for closing said inspection opening.

8. The invention described in claim 4 wherein there is provided a fluid seal between said track, the link and one of said cup elements, and a cap having sealed connection with said support and enclosing the other of said cup elements.

9. In a steam engine including a valve actuating rod: a relatively fixed support; a rocker member operatively connected with said rod and journaled in said support; a sliding cam for actuating said rocker member; means for actuating the sliding cam; a track for said sliding cam; and a resilient connection between said track and said support for holding said cam in firm engagement with said rocker member.

10. The invention described in claim 9 wherein said track is pivotally connected at one end with said support and wherein said resilient connection includes a dashpot fixed to said support, a relatively movable dashpot cover, a spring interposed between the dashpot and the dashpot cover, and a link connecting the dashpot cover with the track at its end opposite its pivotal connection with said support.

GEORGE C. WHITE.